United States Patent [19]
Carbone

[11] 3,770,549
[45] Nov. 6, 1973

[54] METHOD AND APPARATUS FOR MANUFACTURING HONEYCOMB STRUCTURES

[75] Inventor: Angelo F. Carbone, Brooklyn, N.Y.

[73] Assignee: Emmanuele Fallacaro, Commack, Long Island, N.Y.

[22] Filed: Oct. 20, 1971

[21] Appl. No.: 190,856

[52] U.S. Cl............... 156/474, 118/412, 156/197, 242/68.4, 156/548
[51] Int. Cl............................................. B31d 3/02
[58] Field of Search.................. 156/197, 474, 548; 118/221, 222, 411, 412; 242/68.4

[56] References Cited
UNITED STATES PATENTS

| 2,581,421 | 1/1952 | Lombard et al............... | 156/197 X |
| 2,619,444 | 11/1952 | Grantham.......................... | 156/197 |
| 2,800,418 | 7/1957 | Cannon............................ | 118/412 X |
| 2,734,843 | 2/1956 | Steele................................ | 156/197 |
| 2,599,720 | 6/1952 | Drevost.......................... | 242/68.4 X |
| 2,874,408 | 2/1959 | Vieli et al...................... | 156/474 X |
| 3,166,456 | 1/1965 | White et al..................... | 156/197 X |

*Primary Examiner*—Alfred L. Leavitt
*Assistant Examiner*—David A. Simmons
*Attorney*—Allison C. Collard

[57] ABSTRACT

A method and apparatus for manufacturing honeycomb structures from a continuous web of material consisting of a machine for providing transverse parallel perforations at preselected intervals along a web of material, applying adhesive stripes in staggered relationship on opposite sides of the material, and subsequently folding the material in an accordion-like manner along the perforation lines so that adjacent faces of the material are bonded in a glue-to-glue relationship, and processing the material slowly in its compressed form at the output chute of the machine.

10 Claims, 9 Drawing Figures

INVENTOR.
ANGELO F. CARBONE

BY *[signature]*

ATTORNEY.

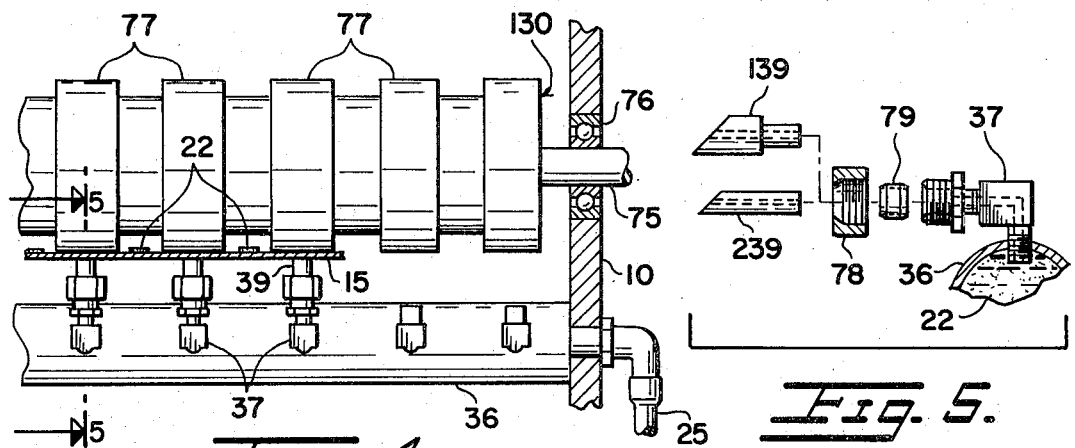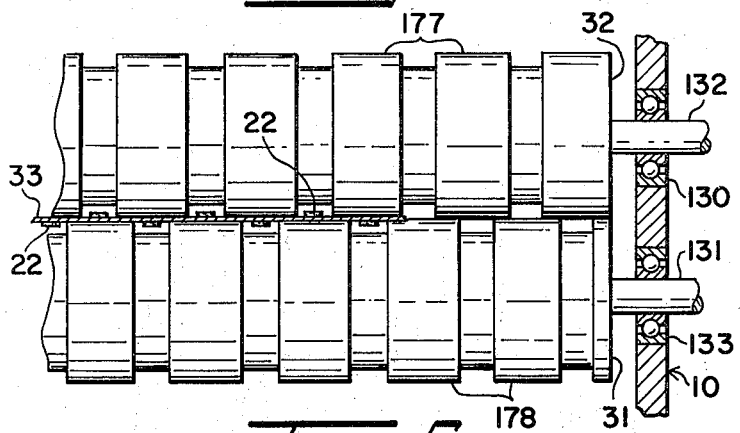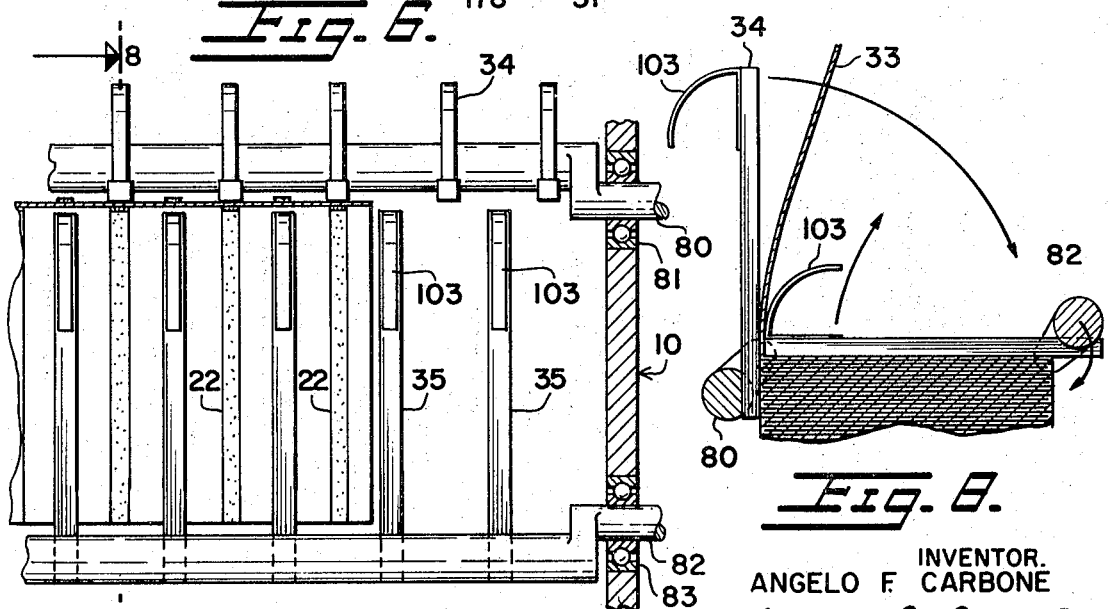

METHOD AND APPARATUS FOR MANUFACTURING HONEYCOMB STRUCTURES

This invention relates to a method and apparatus for use in making honeycomb structures from a continuous web of material.

More specifically, this invention relates to a method and apparatus for fabricating honeycomb structures from a continuous web of material which is adhesively bonded on both sides, scored at predetermined intervals, and folded against its adhesively striped surfaces to form an improved honeycomb structure.

Hexagonal cellular honeycomb structures are well known for their high strength-to-weight ratio and such structrues have been employed for various applications in many fields, such as in the aircraft and architectural industries. Conventional celluloid honeycomb structures are formed from suitable core material in which relatively dense, high strength material strips or sheets are arranged to form hexagonal-shaped cells in which the full strength of the wall defining the cells are utilized to produce tensile and compressive strength in the direction of the cell axis. In conventional apparatus for making honeycomb structures, layers of strips of material, or sheets of material are secured together in staggered relationship in the form of a stack so that the stack may later be expanded into the cellular space. The expansion is effected by pulling the opposite, outermost layers of stacked sheet material away from each other so that the individual cells are formed as the multiple layers are separated.

Conventional honeycomb structures are usually made by laminating a stack of flat ribbons of material, together at staggered bond or node points. Other conventional honeycomb devices utilize a paper web and cutting mechansim for cutting sheets of material, applying adhesive to the sheets in a staggered relationship, and pressing the sheets together to form a bonded structure. These conventional methods and machines for making honeycomb structures suffer from the disadvantage of having low production yields. Moreover, the conventional methods and apparatus are not readily adaptable to continuous operation and require an excessive amount of man hours for their operation.

Accordingly, the present invention provides a method and apparatus for producing high yields of strong honeycomb structures in continuous production from a continuous web of material. The apparatus of the invention includes a spindle for holding a large roll of material, such as paper, aluminum and the like, which is initially scored along its width at predetermined parallel intervals, and then painted with an adhesive bonding material on both sides in staggered relationship. The web of material is then fed into a pair of opposed folding arms which operate alternately to fold the material web in an accordion-like manner along its scored or perforated lines. The folded web of material is thus bonded together along glue-to-glue surfaces to form an extra strength bond. The folded structure is slowly advanced along a curved output chute where it is collected and sized.

It is therefore an object according to the present invention to provide a method and apparatus for fabricating honeycomb structures which have improved strength.

It is another object according to the present invention to provide a method and apparatus for producing honeycomb structures in a continuous output from a web of material.

It is a further object according to the present invention to provide an apparatus which continuously produces honeycomb structures at very high yields.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

In the drawings, wherein similar reference characters denote similar elements throughout the several views;

FIG. 4 is a cross-sectional view taken along section 4—4 of FIG. 1;

FIG. 5 is a detailed plan view of the adhesive distribution system of the method and apparatus of FIG. 1;

FIG. 5A is another embodiment of the adhesive distribution system of the invention;

FIG. 6 is a cross-sectional view taken along section 6—6 of FIG. 1;

FIG. 7 is a cross-sectional view taken along section 7—7 of FIG. 1; and

FIG. 8 is a detailed side view of the folding apparatus of the invention as shown in FIGS. 7 and 1.

Figure 1:
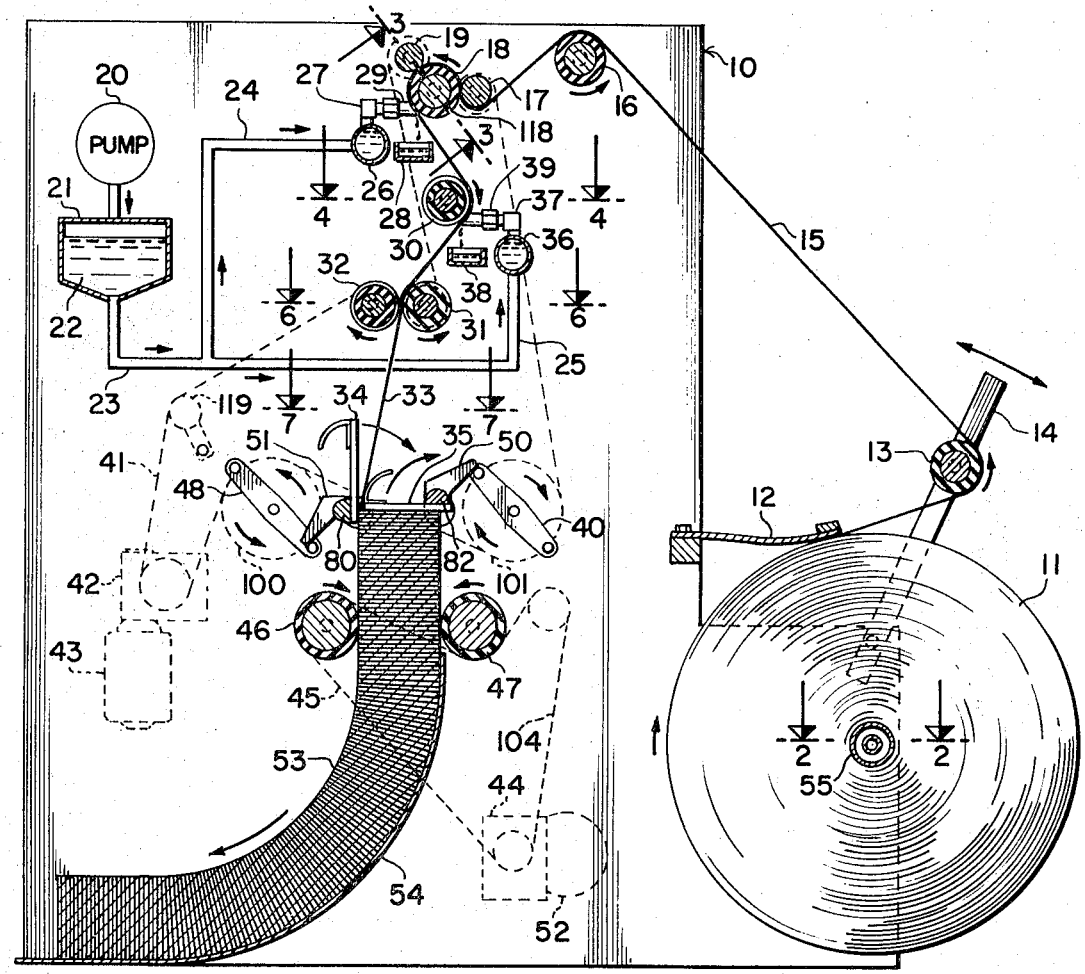
FIG. 1 is a side plan view partly in schematic form of the method and apparatus of the subject invention.

Referring to FIG. 1, there is shown a roll of material 11 mounted pivotably upon spindle 55 at one end of housing 10 of the machine. A drag brake 12 contacts the upper surface of the roller as a sheet of material 15 is pulled off roll 11 over roller 13. Roller 13 is mounted on a tensioning arm 14 which is pivotably connected to frame 10 adjacent to spindle 55.

Figure 2:
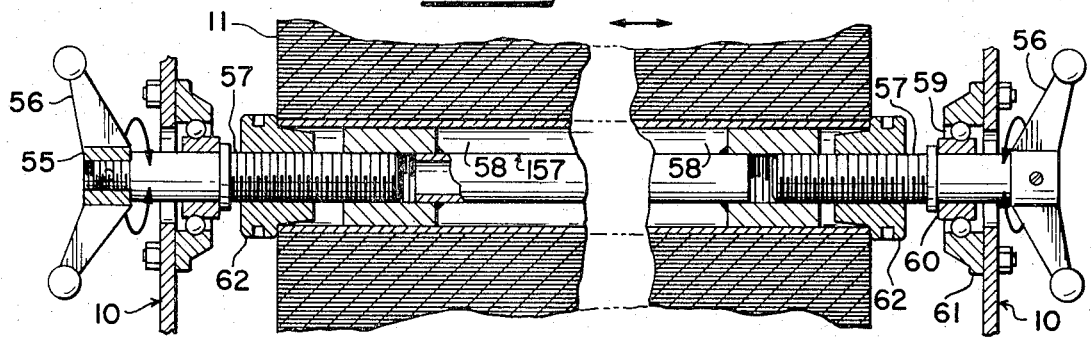
FIG. 2 is a cross-sectional view taken along section 2—2 of FIG. 1.

Spindle 55, as shown in detail in the cross-sectional view of FIG. 2, actually includes a centering mechansim and tensioning device in order to accommodate different types of rolls of material. At each end of spindle 55 are large typing handles 56 which are engaged on the end of shaft 57. Shaft 57 is mounted by means of ball bearings 59 and their accompanying ball bearing raceways 60 and 61 on the sidewalls of housing 10. Positioned at each end of the hollow axis of the roll of material 11 are tapered hubs 62 slidably mounted on shaft 57. The ends of shafts 57 are threadably engaged to cylindrical blocks 58 which are welded to internal shaft 157. Thus, the roll of material 11 can both be centered on shafts 57 by means of tapered hubs 62 and positioned to the proper place along the axis of axle 57 for proper alignment with the honeycomb machine.

The sheet or web of material 15 then passes over rollers 16 and 17, and then fed between a perforating roller 17 and its accompanying pressure roller 18, pivotably mounted in housing 10.

Figure 3:
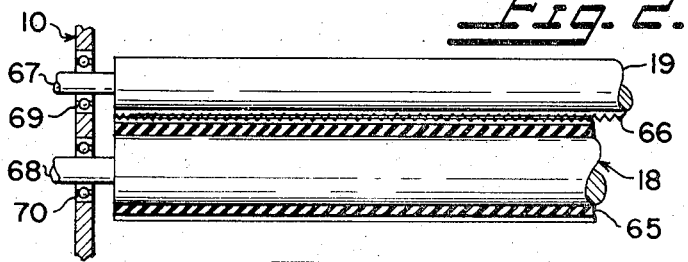
FIG. 3 is a cross-sectional view taken along section 3—3 of FIG. 1.

Pressure roller 18 and perforating roller 19 are shown in detail in FIG. 3. Perforating roller 19 is pivotably supported at each end on axles 67 by ball bearings 69 within housing 10. A cutting or perforating blade 66, which in this embodiment is shown as a saw-tooth blade, is disposed along the length of perforating roller 19. It is obvious that more than one blade can be disposed on the surface of perforating roller 19. Pivotably mounted adjacent to perforating roller 19 is a pressure roller 18 preferably having a resilient or rubber surface 65. The pivotable ends 68 of pressure roller 18 are mounted by means of ball bearings 70 in frame 10. The elastic surface 65 of roller 18 is larger in diameter than roller 19 and includes one or more longitudinal slots 118 (FIG. 1) to receive perforating blade 66. In this embodiment of the invention, a single blade 66 is provided on roller 19, whereas roller 18 is twice the diameter or roller 19, so that two longitudinal slots 118 are formed in the elastic surface 65, at 180° intervals to receive blade 66.

Referring back to FIG. 1, there is shown a pump 20 which applies pressure to an adhesive 22 stored within reservoir 21. The output 23 of reservoir 21 feeds a pair of adhesive lines 24 and 25 which are connected to adhesive manifolds 26 and 36 respectively. The first adhesive manifold 26 couples to a plurality of elbow fittings 27 which are spaced apart on the top surface of the manifold and connected respectively to adhesive distribution nozzles 29, in contact with material 15 as it moves around pressure roller 18. An adhesive catch basin 28 is located below nozzle 29 to catch any excess adhesive which may drip off from material 15.

The second adhesive manifold 36 is similarly connected to a plurality of elbow fittings 37 which are joined to nozzles 39 for applying adhesive strips along material 15 against pressure roller 30. As shown in detail in FIG. 4, pressure roller 30 comprises a plurality of side-by-side resilient rollers 77 which are spaced apart and aligned with nozzles 39 of adhesive distributor 36. Roller 30 is pivotably coupled at each end by means of axle 75 to frame 10 in ball bearing assemblies 76. The adhesive stripes 22 which have been formed on web 15 from the first set of nozzles 29 pass freely between the slots formed between elastic rollers 77.

FIG. 5 is a detailed view of types of nozzles which may be employed to stripe web 15 with adhesive material. Nozzle 139 has a large contacting surface for applying the adhesive to web 15, whereas nozzle 239, which also may be connected to couplings 78 and 79, has a smaller contacting surface. In an actual embodiment of the invention, where web 15 was fire retardant Kraft paper, the adhesive used was 80 per cent solid, and applied under a pressure of approximately between 50 and 60 pounds to the manifold. The adhesive is applied by a capillary action against both surfaces of web 15 as the web is drawn across the nozzle opening. The adhesive is thus evenly and accurately striped onto the web surface and very little excess of adhesive is produced in catch pans 28 and 38.

An alternate form of applying adhesive to web 15 is shown in FIG. 5A, whereby a striping roller 130 pivots in an adhesive bath 22 and is urged against roller 30. The adhesive is contained in a basin 122 disposed below striping roller 130. Stripping roller 130 would obviously contain a plurality of side-by-side spaced-apart rollers similar to rollers 77, but narrower in width.

Referring to FIG. 6, web 15 which has been striped on both sides of adhesive 22, and hereinafter referred to as web 33, passes between drive rollers 32 and 31 which are pivotably mounted on axles 132 and 131 within the frame 10 by means of ball bearings 130 and 133 respectively. Rollers 177 are preferably formed on drive roller 32 of a resilient or rubber-like material and spaced apart between the adhesive stripes 22 on one side of web 33. In a similar manner, side-by-side rollers 178 on drive roller 31 are staggered with respect to rollers 177 and also spaced apart between adhesive stripes 22 on the opposite side of web 33. In this manner, none of the adhesive contaminates the drive rollers.

Referring briefly back to FIG. 1, there is shown a main drive motor 43 which in one of the preferred embodiments is a DC motor of 2-3 horsepower connected to a gear reduction box 42 and powered by a variable speed control circuit. A chain 41 is coupled to rollers 31 and 32 over idler sprocket 49. Chain 41 forms a closed loop around drive roller 17, pressure roller 18 and perforating roller 19, and around sprockets 101 and 100 which operate folding arms 35 and 34 respectively. Sprocket 101 drives lever 40 which includes cam pins mounted on each end, for contact with pawl 50 connected to shaft 82. In a similar manner, sprocket 100 drives lever 48 so that its cam pins mounted on each contact pawl 51 mounted on crankshaft 80. Crankshafts 80 and 82, as shown in detail in FIG. 7, are pivotably mounted within frame 10 of the apparatus housing by means of ball bearing assemblies 81 and 83 respectively. Mounted on the offset portion of shaft 80 are a plurality of spaced-apart folding arms 34. In a similar manner, a plurality of folding arms 35 are geared to alternate with respect to arms 34. Arms 35 are spaced apart to fall between adhesive stripes 22 on one surface of web 33, while folding arms 34 are staggered with respect to arms 35, and likewise fall between the adhesive stripes on the opposite side of web 33. In that manner, none of the folding arms comes into contact with the adhesive applied to web 33.

Referring back to FIG. 1, a second drive motor 52 is provided, coupled to gear box 44 so as to drive an endless chain 104 which is coupled to drive rollers 46 and 47. Drive rollers 46 and 47 are also pivotably coupled to each side of chassis 10 and include resilient or frictionally engaging surfaces, for engaging the folded or compressed honeycomb structures as it moves down in arch-shaped outlet trough 54 formed near the bottom of the machine. The speed in which motor 52 operates is dependent upon the amount of sheet thickness folded by folding arms 34 and 35. Chain 104 may also be coupled to motor 43 and adapted to operate in conjunction with the speed of the folding and the thickness of the web material being formed into the honeycomb structure.

Referring back to FIG. 7, as web material 33 is fed into the folding area from drive rollers 31 and 32, the folds occur at the perforation lines formed in spaced-apart transverse intervals of web 33. The ends of each of the folding arms 34 and 35 include flexible metal curls 103 so that the ends of the folding arms do not become entangled with the surface of the web, but release freely in order to return to their momentary upright position. Folding arms 34 and 35, because they are mounted on the offset portion of shafts 80 and 82, move slightly upward, over web 33 before pressing downward to accomplish the fold along each of the perforated lines.

The compressed honeycomb structure moves continuously along curved output chute 54 and can be collected or sized whenever required. As the roll 11 of the web of material becomes exhausted, a new roll can be easily dropped in place and spliced to the former roll by momentarily shutting down the apparatus for a short interval of time. The housing of the machine could be adapted to receive a second roll 11, mounted above the first roll, to be held in reserve as the first roll is exhausted.

In an actual embodiment of the present invention, the perforation roller was set to perforate the web of material at 8-inch intervals so that the folds occurred in the folding area at 8-inch widths. Thus, the compressed honeycomb structure which was formed has a depth of 8 inches. It is obvious from the dimensions provided for the preferred embodiment that the spacing between the perforations formed on the web of material can be varied, depending upon the number of cutting blades and the diameter of the perforation roller inserted in the apparatus. Likewise, the spacing of the adhesive manifolds and the width of the adhesive stripe can be varied to enlarge or make smaller the cells formed in the resultant honeycomb structure.

A lateral cutting machine is preferably located at the output of the present apparatus in order to cut the honeycomb to the desired depth required for architectural or aircraft use. The compressed honeycomb structure coming out of the output inventive machine can later be expanded by well known techniques so that the perforated edges will easily open to form strong honeycomb cells.

In a full-size embodiment of the present invention a roll of web material 72 inches wide, and weighing 2,000 pounds, was mounted on spindle 55 at one end of the machine. Running at 40 per cent full speed, the machine produced approximately 1,100 pounds of honeycomb structure per hour. The adhesive bonds formed between adjacent folds of the webbed material are extremely strong since two common faces of the material are always folded against each other with aligned adhesive stripes so that a glue-to-glue bond is formed rather than a paper-to-glue bond as in conventional machines. It has been found that before the bond could be broken, the web of material has to be destroyed.

While only a few embodiments of the present invention have been shown and described, it will be obvious that many changes and modifications may be made thereunto without departing from the spirit and scope of the invention.

What is claimed is:

1. An apparatus for manufacturing honeycomb structure from a continuous web of material and an adhesive comprising:

cutting means for forming at least a partial cut at spaced-apart transverse intervals in the web of material, a first nozzle emitting adhesive striping means for applying a first plurality of longitudinally disposed adhesive strips spaced apart on at least one side of the material, a second nozzle emitting adhesive striping means for applying a second plurality of longitudinally disposed adhesive stripes spaced apart on the obverse side of said material, said second plurality of stripes being in staggered relationship with said first plurality of adhesive stripes, folding means with fork-shaped arms, following said first and second adhesive means for folding adjacent adhesively striped surfaces together in an accordion-like pattern while simultaneously applying pressure to the fold to compress the adhesive bond, said cutting means forming said cut before applying said adhesive stripes and, incrimental output means following said folding arms engaging the opposite sides of said folded honeycomb structure for advancing said folded structure in proportion to the thickness of the material being folded, so that the folded honeycomb structure is continuously produced at the output of the apparatus.

2. The apparatus as recited in claim 1, wherein said cutting means comprises a perforating roller, having at least one perforating blade axially disposed on its circumference, and a pressure roller mounted adjacent to said perforating roller for capturing the web of material therebetween so that the movement of said perforating edge against said pressure roller forms a plurality of perforations in one side of said web.

3. The apparatus as recited in claim 1, wherein said first adhesive means comprises an adhesive distributor having a plurality of spaced-apart nozzles in contact with the moving web of material, and pressure means for urging the adhesive into said distributor and through said nozzles to form a plurality of spaced-apart parallel stripes on at least one side of the material.

4. The apparatus as recited in claim 3, wherein said second adhesive means comprises an adhesive distributor having a plurality of spaced-apart nozzles in contact with said moving web of material and pressure means for urging said adhesive into said distributor and through said nozzles to form a plurality of spaced-apart parallel stripes on the obverse side of the material.

5. The apparatus as recited in claim 1, wherein said folding means comprises a first plurality of parallel spaced-apart folding arms pivotably coupled on one side of said perforated web of material and forming a first fork-shaped member and a second plurality of oppositely directed parallel spaced-apart folding arms staggered with respect to said first set of folding arms and pivotably coupled for forming a second fork-shaped member to operate alternately with respect to said first arms against the opposite side of the web of material.

6. The apparatus as recited in claim 5, wherein said first and second pluralities of spaced-apart folding arms are staggered with respect to the adhesive stripes formed on the sides of the web material.

7. The apparatus as recited in claim 6, wherein said first and second folding arms are mounted for pivotable movement on off-set crank shafts, so that said arms alternately move upward and over each pleat of the material to complete the fold.

8. The apparatus as recited in claim 5, wherein each of said first and second folding arms additionally comprise flexible curls secured on the free ends thereof.

9. The apparatus as recited in claim 1 additionally comprising an adjustable spindle for supporting the roll containing said web of material, said spindle including opposite adjustable handles, threadably engaged to said spindle for aligning said web of material with respect to said apparatus.

10. An apparatus for manufacturing honeycomb structure from a continuous web of material and an adhesive comprising:

a perforating roller mounted on the apparatus and having at least one perforating blade axially disposed on its circumference for contact across the width of the continuous web of material;

a pressure roller urged against the perforating blade for capturing the web of material so that the movement of the perforating edge against the pressure roller forms a plurality of perforations through one side of the web;

a first adhesive distributor following said perforating roller, having a plurality of spaced-apart nozzles in contact with the moving web of material and pressure means for urging the adhesive into said distributor and through said nozzles to form a plurality of spaced-apart parallel stripes on at least one side of the web;

a second adhesive distributor having spaced-apart nozzles in contact with the opposite side of the moving web of material and connected to said pressure means so as to from a plurality of spaced-apart parallel adhesive stripes on the reverse side of the web;

a first plurality of parallel spaced-apart folding arms following said first and second adhesive distributors pivotably coupled on one side of said web and having a first fork-shaped member for contacting the web between the adhesive stripes on one side thereof, a second plurality of parallel spaced-apart folding arms pivotably coupled for forming a second fork-shaped member to operate alternately with respect to said first folding arms against the opposite side of the web between adhesive stripes thereof so as to fold adjacent adhesively striped surfaces together in an accordion-like pattern while simultaneously applying pressure to the fold to compress the adhesive bond, said first and second folding arms being mounted for pivotable movement on off-set crank shafts so that said arms alternately move upward and over each pleat of the material to complete the fold;

incrimental output means folding said folding arm engaging the opposite sides of said folded honeycomb structure for advancing said folded structure in proportion to the thickness of the material being folded; and an adjustable spindle for supporting the roll containing said web of material, said spindle including opposite adjustable handles threadably engaged to said spindle for aligning said web of material with respect to the apparatus.

* * * * *